(12) United States Patent
Antonelli et al.

(10) Patent No.: US 6,860,684 B2
(45) Date of Patent: Mar. 1, 2005

(54) LOADING SYSTEM FOR SECURING CARGO IN THE BED OF A VEHICLE

(75) Inventors: Robert Antonelli, Huntsville, AL (US); David Harper, Huntsville, AL (US); Dennis M. Pape, Decatur, AL (US); Wayne L. Reed, Huntsville, AL (US); Richard W. Seeman, Madison, AL (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/643,133

(22) Filed: Aug. 18, 2003

(65) Prior Publication Data

US 2004/0070228 A1 Apr. 15, 2004

Related U.S. Application Data

(63) Continuation-in-part of application No. 10/267,771, filed on Oct. 9, 2002.

(51) Int. Cl.$^7$ ................................................ B60P 7/08
(52) U.S. Cl. ........................ 410/69; 410/77; 410/96
(58) Field of Search ............................ 410/69, 80, 90, 410/91, 77, 96, 97, 100

(56) References Cited

U.S. PATENT DOCUMENTS

| | | | | |
|---|---|---|---|---|
| 5,494,386 | A | * | 2/1996 | Paull ............................ 410/77 |
| 5,636,951 | A | * | 6/1997 | Long et al. .................... 410/85 |
| 6,039,519 | A | * | 3/2000 | Jones et al. ................... 410/69 |
| 6,047,989 | A | * | 4/2000 | Wood .......................... 280/789 |
| 6,318,947 | B1 | * | 11/2001 | Hahn et al. ................. 414/401 |
| 2004/0070227 | A1 | | 4/2004 | Pape et al. |

* cited by examiner

Primary Examiner—Joseph D. Pape
(74) Attorney, Agent, or Firm—Iandiorio & Teska (57) ABSTRACT

A loading system for securing cargo with, typically, at least two spaced forwardly located pin and receptacle assemblies and at least two spaced rearwardly located tensioning systems.

26 Claims, 11 Drawing Sheets

LOADING SYSTEM FOR SECURING CARGO IN THE BED OF A VEHICLE

RELATED APPLICATIONS

This application is a continuation-in-part application of patent application Ser. No. 10/267,771, filed Oct. 9, 2002, entitled MOBILE BATTLE CENTER AND COMMAND TABLE FOR A MOBILE BATTLE CENTER.

FIELD OF THE INVENTION

This invention relates to a loading system assembly for securing cargo of various configurations in vehicles including, but not limited to, military vehicles.

BACKGROUND OF THE INVENTION

Cargo is routinely secured with respect to the bed of a transport vehicle by straps and the like. There are many situations, however, when the forward and even the side portions of the cargo are inaccessible. Consider a high mobility, multi-purpose wheeled vehicle (HMMWV) used by the military. The bed is often covered and, with large cargo pieces, access to the forward and side portions of the cargo is very restricted. To make matters worse, sometimes the cargo includes delicate equipment which must be secured in the HMMWV as it traverses rough terrain. HMMWVs are even air-lifted in transport aircraft and sometimes dropped form the aircraft via a parachute. Accordingly, the cargo must be adequately secured in the HMMWV.

At the same time, the systems used to adequately secure the cargo must facilitate deployment and storage even with access limitations due to the size of the cargo. Moreover, it is often the case where the cargo is fairly heavy and/or awkward to maneuver. Once the HMMWV reaches the intended battle field location, personnel must be able to quickly unload and deploy the cargo and then, later, quickly load and secure the cargo back in the vehicle.

These seemingly mutually contradictory requirements, namely, ruggedization, ergonomics, and ease of deployment and stowage, have not been adequately met in loading systems associated with the known prior art.

BRIEF SUMMARY OF THE INVENTION

It is therefore an object of this invention to provide a new loading system for securing cargo in the bed of a vehicle.

It is a further object of this invention to provide such a loading system which adequately secures the cargo in a rugged manner.

It is a further object of this invention to provide such a loading system which facilitates easy stowage and deployment in an ergonomic manner even when access to portions of the cargo is restricted.

It is a further object of this invention to provide such a loading system which facilitates easy stowage and deployment in an ergonomic manner even when the cargo is heavy and/or awkward to handle.

It is a further object of this invention to provide such a loading system which facilitates deployment and stowage in an efficient and quick manner.

It is a further object of this invention to provide such a loading system which pre-loads the cargo.

It is a further object of this invention to provide such a loading system which accommodates different dimensional tolerances.

It is a further object of this invention to provide such a loading system which provides high structural strength.

It is a further object of this invention to provide such a loading system which is particularly well suited for securing a folding command table in the bed of an HMMWV but which can also be adapted for use in connection with other types of cargo and other types of vehicles.

The invention results from the realization that a stable and secure loading system which at the same time facilitates deployment and stowage in an ergonomic manner is effected by the combination of forward pin and bracket assemblies which secure the cargo radially, pre-load the cargo along the axis of the pin, and accommodate different dimensional tolerances and, in addition, rearward tensioning assemblies providing both horizontal and vertical loading and ease of deployment and stowage. Teflon support strips between the bottom of the cargo and the bed of the vehicle further facilitate deployment and stowage and also secure the cargo in the transverse direction.

This invention features, in the preferred embodiment, a loading system for securing cargo, the system comprising at least two spaced forwardly located pin and receptacle assemblies each including a pin biased outward with respect to a housing fixed to one of the cargo and a vehicle, and a receptacle on the other of the cargo and the vehicle for receiving the pin to pre-load the cargo and to secure the cargo in vertical and transverse directions. At least two spaced rearwardly located tensioning systems each include a member securable to one of the cargo and the vehicle, a pivoting clamp handle secured to the other of the cargo and the vehicle for tensioning the member, and a member guide which orients the member at an angle with respect to the vertical direction to secure the cargo in both the horizontal and vertical directions.

Also included may be low friction strips running in the horizontal direction between the bed and the cargo assisting in deployment and stowage of the cargo. In one example, selected strips include a ridge for securing the cargo in the transverse direction.

In one embodiment, the cargo is a foldable command table including an aft section, a forward section, and an intermediate section hinged to the forward section and the aft section, and at least one bracket upstanding from the proximal end of the forward section supporting the distal end of the aft section when the aft section is folded up and over the forward section. In this embodiment, the pin and receptacle assemblies are located at the proximal end of the forward section and the clamping systems are located on the intermediate section. Each pin includes a tapered tip and a plurality of washers disposed about the pin and received in the housing for biasing the pin. The receptacle is in the form of a block on the cargo with a cavity therein for receiving the pin.

Further included is a clamp plate with an ear to which the handle is pivotably connected. The strap guide is fixed to the clamp plate and a strap tensioner pivotably connected to the handle, the strap connected to the distal end of the strap tensioner. Ine one example, the clamp plate is secured to the cargo.

In the other aspect of the invention, the loading system comprises at least one pin and receptacle assembly including a pin biased outwardly with respect to a housing, a receptacle for receiving the pin to pre-load cargo and secure the cargo in the vertical and transverse directions, and at least one tensioning system for securing the cargo in both the horizontal and vertical directions. One tensioning system includes a strap, a pivoting clamp handle for tensioning the strap, and a strap guide which orients the strap at an angle to secure the cargo in both the horizontal and vertical directions. Other tensioning systems, however, are possible.

In another aspect of the invention, the loading system comprises a first assembly configured to pre-load cargo in the horizontal direction and to secure the cargo in the vertical and transverse directions and a tensioning assembly including a strap, a pivoting clamp handle for tensioning the strap, and a strap guide which orients the strap at an angle to secure the cargo in both the vertical and horizontal connections. One species of the first assembly is a deflectable pin and receptacle assembly. Other assemblies or systems, however, are possible.

Thus, one loading system of the subject invention includes first means for securing cargo in the vertical and transverse directions and for pre-loading the cargo in the horizontal direction and second means for securing the cargo in both the horizontal and vertical directions. In the preferred embodiment, the first means is a forwardly located deflectable pin and receptacle assembly and the second means is a rearwardly located tensioning system. Other equivalent structures are also possible, however.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
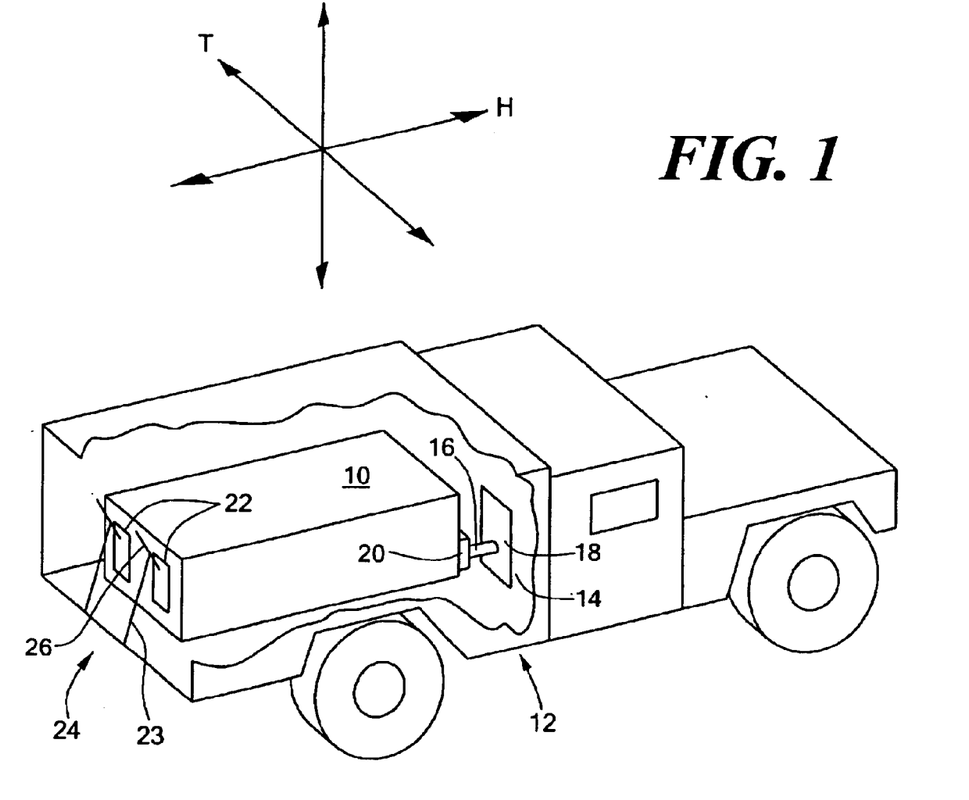
FIG. 1 is a schematic three-dimensional view showing the primary components associated with the preferred loading system of the subject invention.

The loading system of this invention, in one embodiment, is used to ergonomically secure cargo 10, FIG. 1 in the bed of vehicle 12 shown in FIG. 1 to be a HMMWV. The system typically includes a first assembly configured to or means for pre-loading the cargo in the vehicle in the horizontal direction and for securing the cargo in the vertical and transverse directions. In one preferred embodiment, there are two spaced forwardly located pin and receptacle assemblies 14 each including pin 16 biased outward with respect to housing 18 fixed to vehicle 12. Receptacle 20 is fixed to cargo 10 for receiving pin 16 to pre-load cargo 10 in the horizontal (H) direction and to secure cargo 10 in the vertical (V) and transverse (T) directions. This configuration could be reversed, however: pin 16 and housing 18 could be attached to cargo 10 and receptacle 20 could be in or on vehicle 12.

The loading system of this invention also features a second assembly configured to or means for securing the cargo in both the horizontal and vertical directions. In one preferred embodiment, there are two spaced rearwardly located tensioning systems 22 each including a member such as strap 23 securable on one end to vehicle 12 as shown at 24, pivoting clamp handle 26 on cargo 10 for tensioning strap 23, and a strap guide (not shown in FIG. 1) which preferably orients strap 23 at an angle with respect to the vertical direction (V) to secure cargo 10 in both the horizontal (H) and vertical (V) directions. This configuration could also be reversed, however: handle 26 could be pivotably attached to vehicle 12.

In this way, the forward, restricted portion of cargo 10 need not be accessed in order to adequately secure the cargo. Instead, as cargo 10 is slid in to the bed of vehicle 12, pin 16 is received in receptacle 20 and urged (displaced) inward by tensioning clamps 22 to pre-load cargo 10 in the horizontal direction, to accommodate dimensional tolerances, and to secure the forward portion of cargo 10 in the vertical and transverse directions. Preferably, there is at least one other pin and receptacle assembly spaced transversely from the pin assembly shown in FIG. 1. Straps 23, once tensioned using handle 26, secure the rear of cargo 10 in vehicle 12 in both the horizontal and vertical directions. Then, to remove cargo 10 from vehicle 12, straps 23 are loosened and cargo 10 is simply slid out and deployed.

Figure 2:
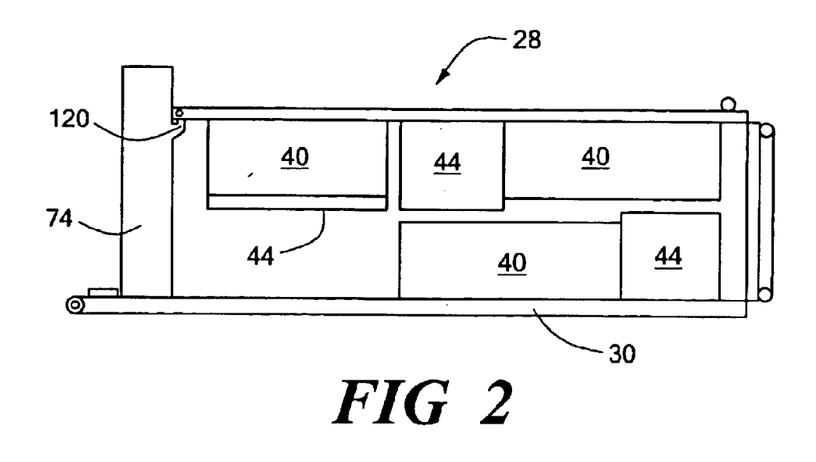
FIG. 2 is a side view of one type of cargo in the form of a folding command table in accordance with the subject invention.

In one example, cargo 10 is in the form of foldable command table 28, FIG. 2 with aft section 34, forward section 30, and electronic equipment stations 40 and 44 securely mounted to the aft section, the forward section, or both sections. Intermediate section 32 is hinged to forward section 30 and aft section 34. Aft section 34 is foldable up and over forward section 30 for transport of the table. Intermediate section 32 provides clearance for the electronic equipment stations when the table is folded. Two upstanding brackets 74 support the distal end of aft section 34 in the folded configuration. See U.S. patent application Ser. No. 10/267,771, filed Oct. 9, 2002, incorporated herein by this reference.

Figure 3:
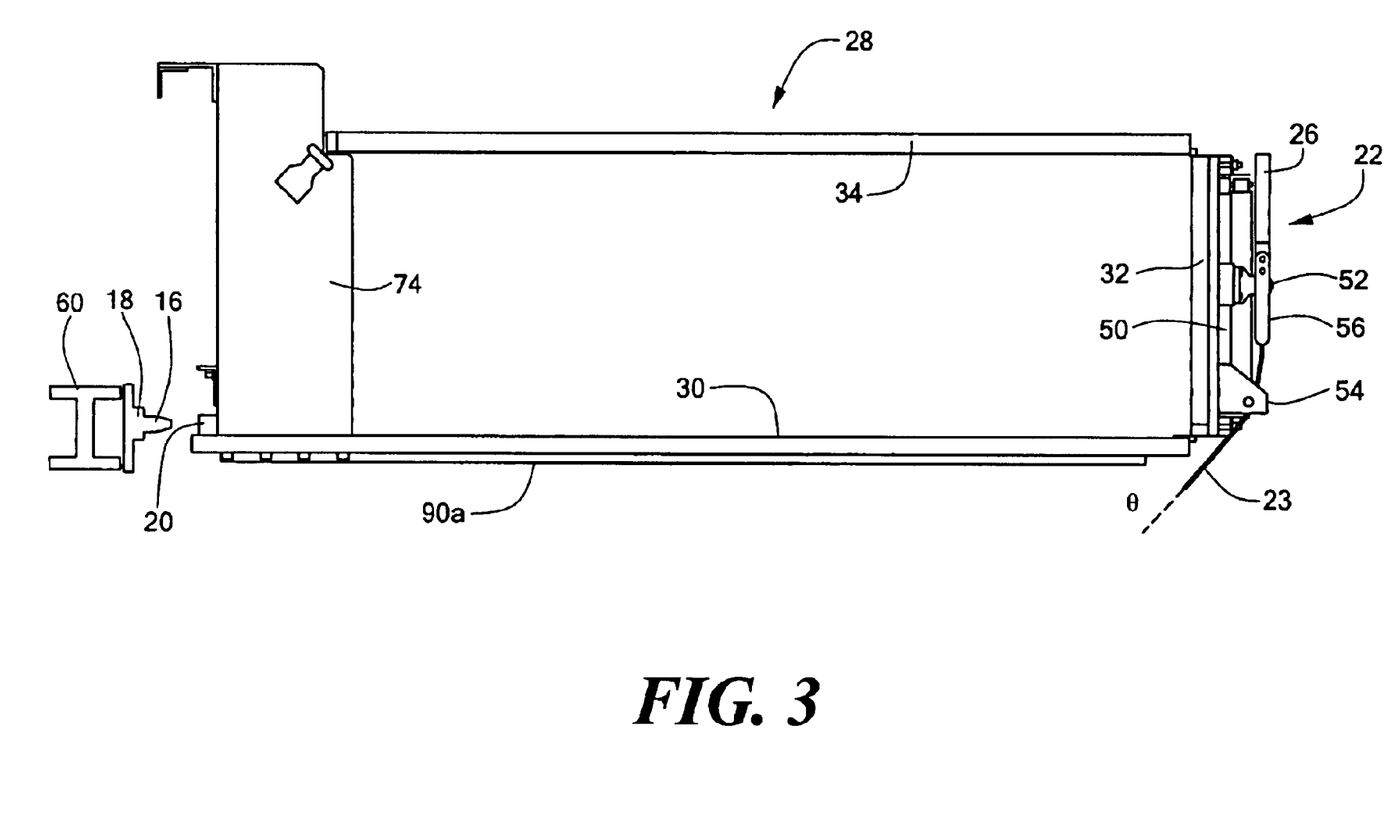
FIG. 3 is a side view showing the orientation of one example of a loading system in accordance with the subject invention in connection with the folding command table shown in FIG. 3.

In this specific example, aft or rearward tensioning system 22 includes clamp plate 50 attached to intermediate section 32 of table 28 with ear 52 to which handle 26 is pivotably connected. Strap guide 54 is fixed to plate 50 and orients strap 23 at an angle θ with respect to the vertical direction to secure table 28 in both the horizontal and vertical directions. θ can be varied to increase the amount of vertical loading or, conversely, to increase the amount of horizontal loading. Strap tensioner 56 is pivotably connected to handle 26. Thus, one end or portion of strap 23 is attached to tensioner 56 and the other end or another portion of strap 23 is attached to the vehicle such that when handle 26 is urged upward, tensioner 56 tensions strap 23. Other types of tensioning systems, however, may be used in connection with the loading system of the subject invention.

Strap 23 can be attached to tensioner 56 by a hook, for example, and attached to the bed of the vehicle also by a hook and receptacle combination. The strap may be adjustable in length or even tailored in length so that it provides the appropriate loading on table 28. Biased pin 16 prevents overloading or underloading of the table when the strap is too short or too long by incorporating a displacement tolerance which corresponds to a loading tolerance. Handle 26 can be locked in the upward position by a pin or a clasp or by the use of handle systems with an over-the-center automatic locking feature.

The pin 16 and receptacle 28 sub-assemblies are located at the proximal end of forward section 30 of the table with receptable 20 located on table 28 as shown and pin housing 18 attached to member 60 of the vehicle. In this example, member 60 is an I-beam but pin housing 18 could be attached to a different structural component of the vehicle. Pin 16 typically includes tapered tip 62, FIGS. 4–5 receivable in receptacle 20 in the form of a block with a cavity therein for receiving the pin as shown in FIGS. 5–6. This configuration of the receptacle, however, is not a necessary limitation of the invention. Instead, other types of receptacles or even a simple hole drilled or formed in the table or other types of cargo may serve as the receptacle for pin 16.

Figure 4:
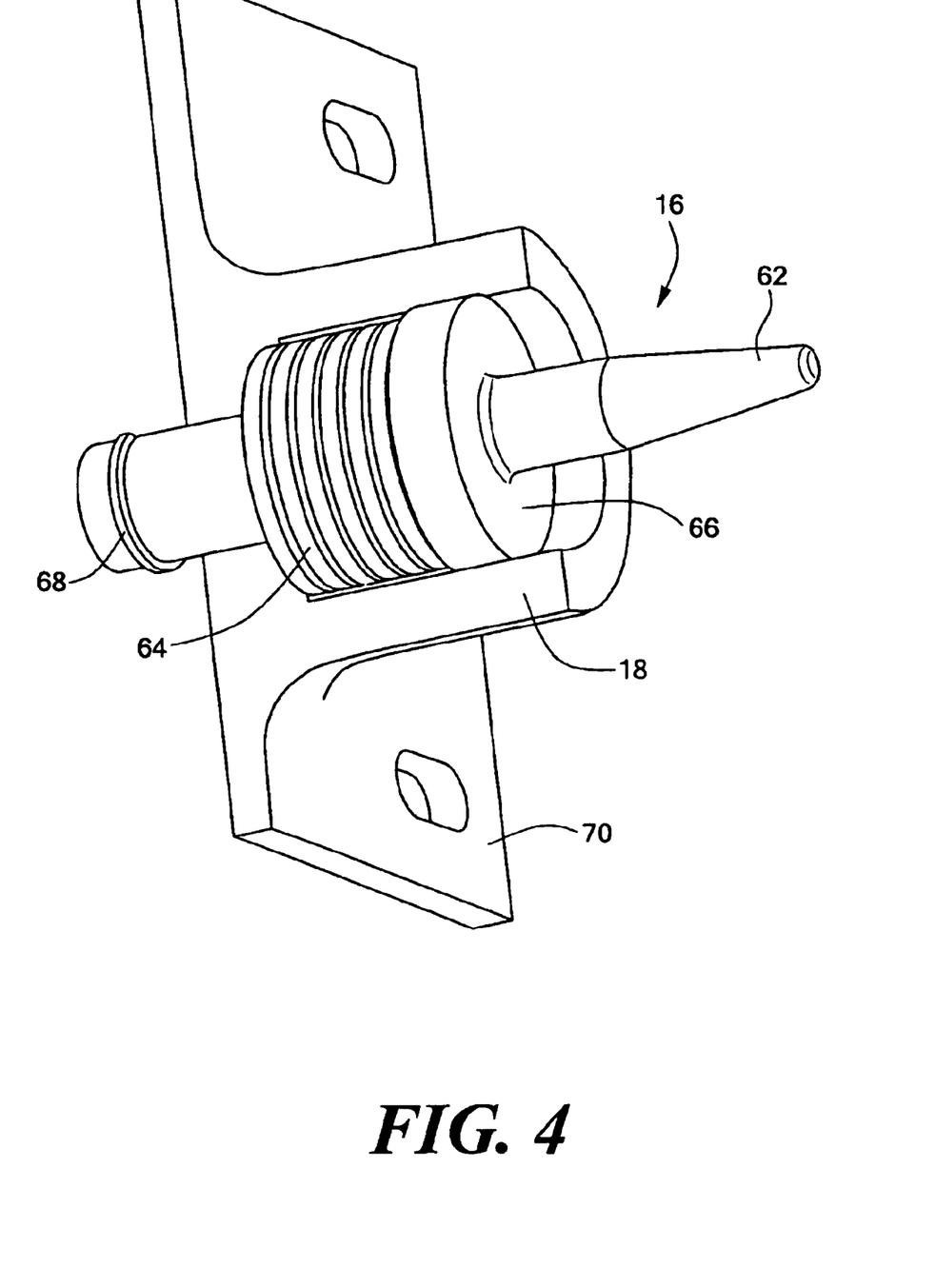
FIG. 4 is a schematic three dimensional view showing in more detail the pin and housing sub-assembly of the preferred embodiment of the subject invention.
Figure 5:
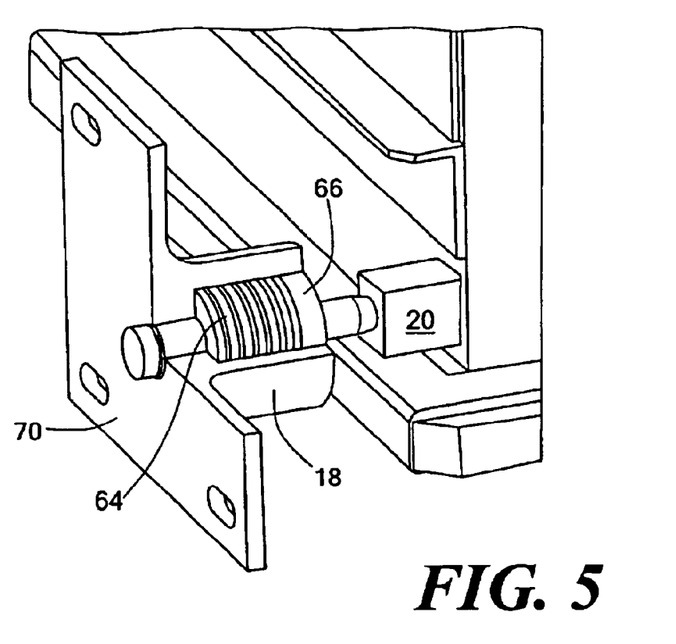
FIG. 5 is a schematic three dimensional view showing the pin and housing sub-assembly of FIG. 4 before loading.
Figure 6:
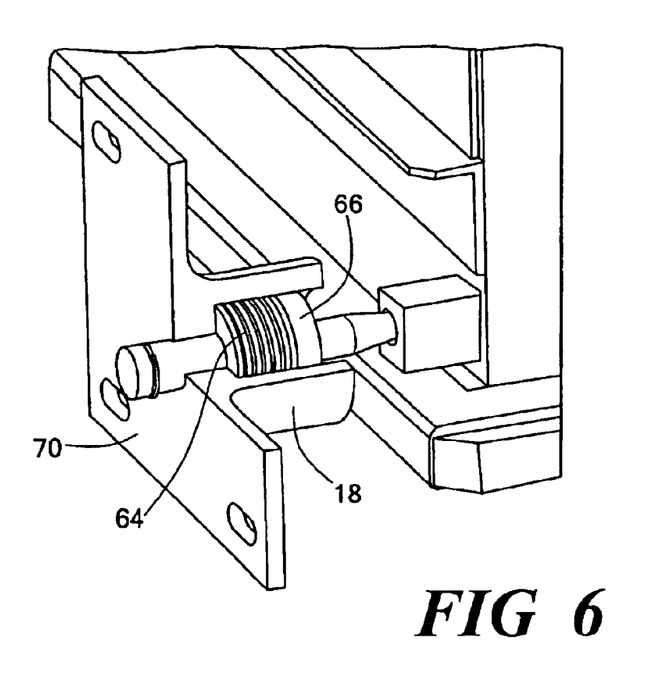
FIG. 6 is a schematic three dimensional view showing the pin housing sub assembly of FIG. 5 after loading.

Belleville washers 64 in housing 18 surround pin 16 and bias pin 16 outward with respect to housing 18 as shown in FIGS. 4–5 but, when compressed as shown in FIG. 6, pre-load the cargo horizontally and yet also provide dimensional tolerance. Other biasing systems, however, such as a spring could also be used. Also, it may be preferable to place flat washers between the Belleville washers to accommodate edge misalignment between the washers. Pin push plate 66 compresses washers 64 and retaining ring 68 prevents pin 16 from being dislodged out of housing 18. Housing 18 itself extends outward from plate 70 which can be attached to the vehicle. Pin 16 and receptacle 20 support table 28 in the radial direction and pre-loads the cargo in the horizontal direction. Other types of forward securing systems other than pin and receptacle assemblies, however, are within the scope of this invention including systems which rely solely on friction to prevent movement of the cargo in the vertical and/or transverse directions.

Figures 7, 8:
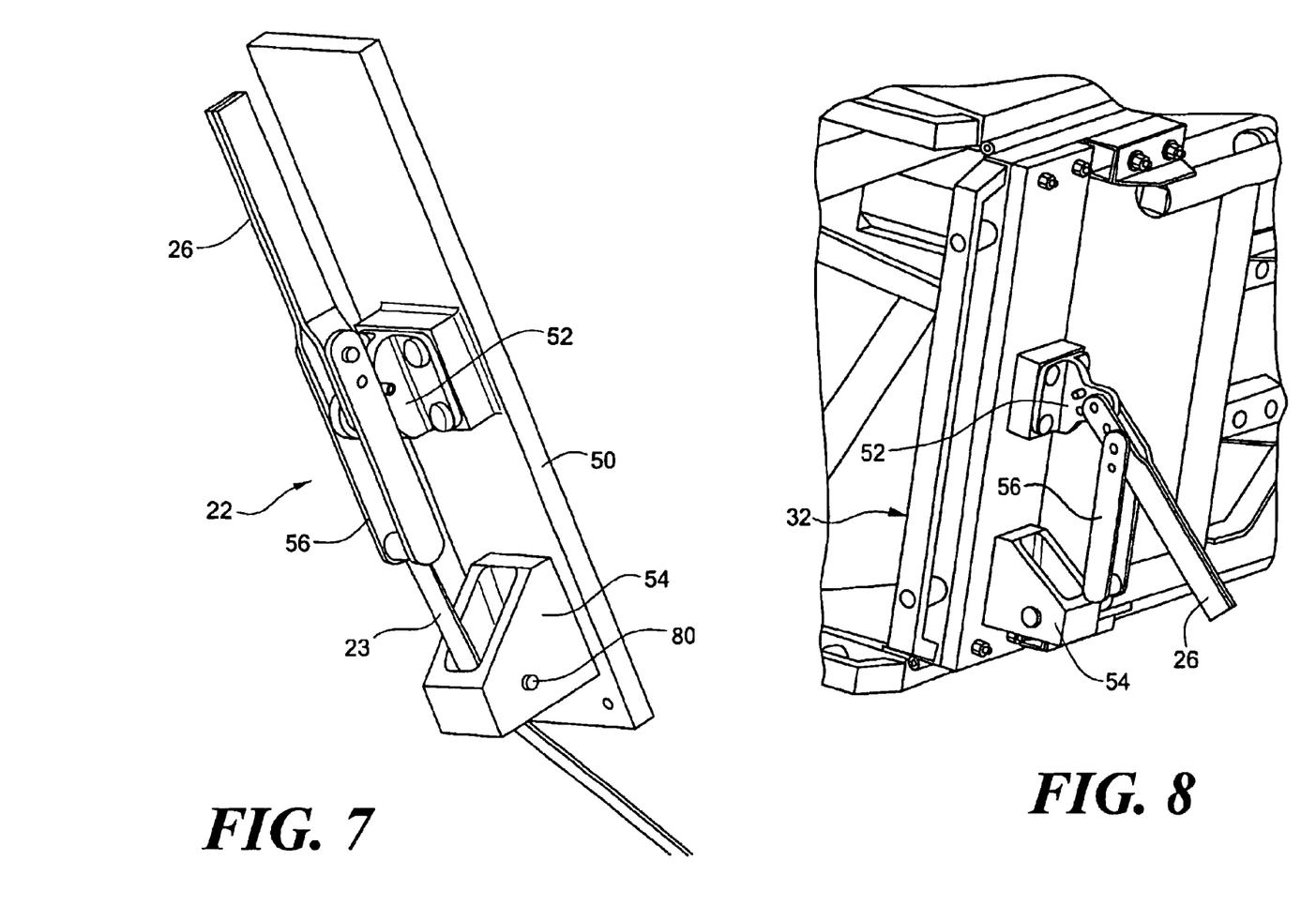
FIG. 7 is a schematic three dimensional view showing the primary components associated with the tensioning systems of the preferred embodiment of the subject invention.
FIG. 8 is a schematic three dimensional view showing the tensioning system of FIG. 7 attached to the intermediate section of a folding command table and the handle of the tensioning system in the untensioned state.
Figure 9:
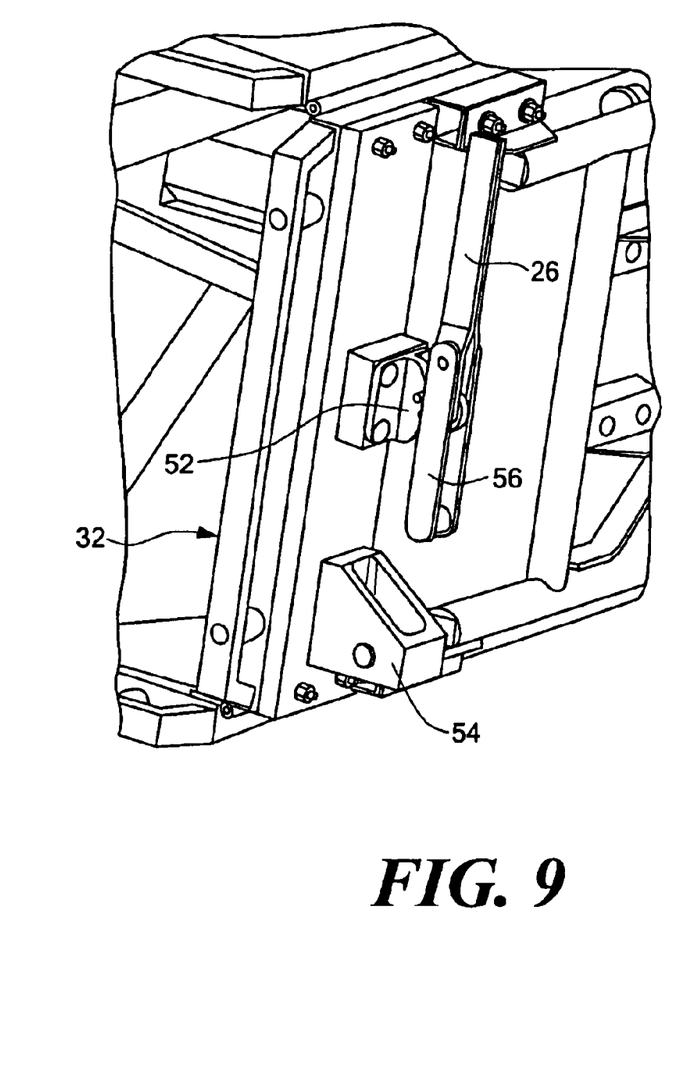
FIG. 9 is a three dimensional schematic view showing tensioning system of FIG. 8 attached to the intermediate section of a folding command table with the handle now in the tensioned state.

FIGS. 7–9 show in more detail one preferred example of the preferred rearwardly located tensioning systems. Clamp plate 50 is attached to intermediate section 32 of the command table and includes both ear 52 and guide 54. Handle 26 is pivotably connected to ear 52 as shown in FIG. 8 and tensioner 56 is pivotably connected to handle 26. Strap 23 is tensioned in FIGS. 7 and 9 when handle 26 is urged upward and strap 23 is loose when handle 26 is brought down as shown in FIG. 8.

Figure 10:
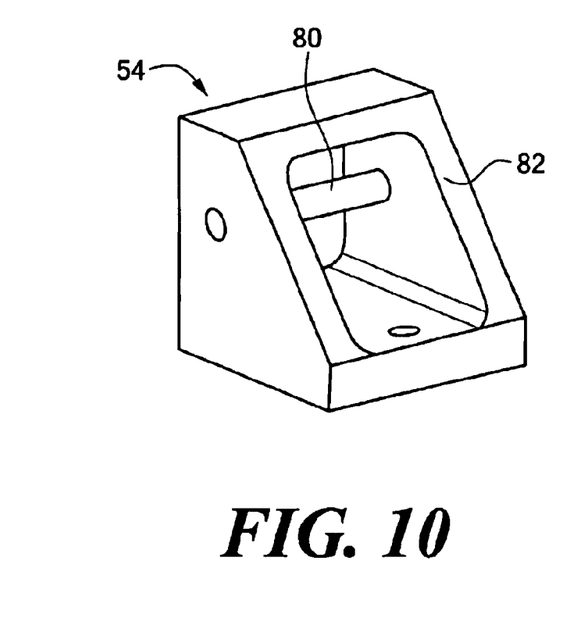
FIG. 10 is a schematic three dimensional view showing an embodiment of the strap guide assembly of the tensioning system of the invention.

Strap guide 54 includes pin 80, FIGS. 7 and 10 in housing 82 which orients strap 23 to secure the cargo in both the horizontal and vertical directions. Other configurations for the strap guide are possible, however. And, in some designs, a strap guide may not be required.

Figure 11A:
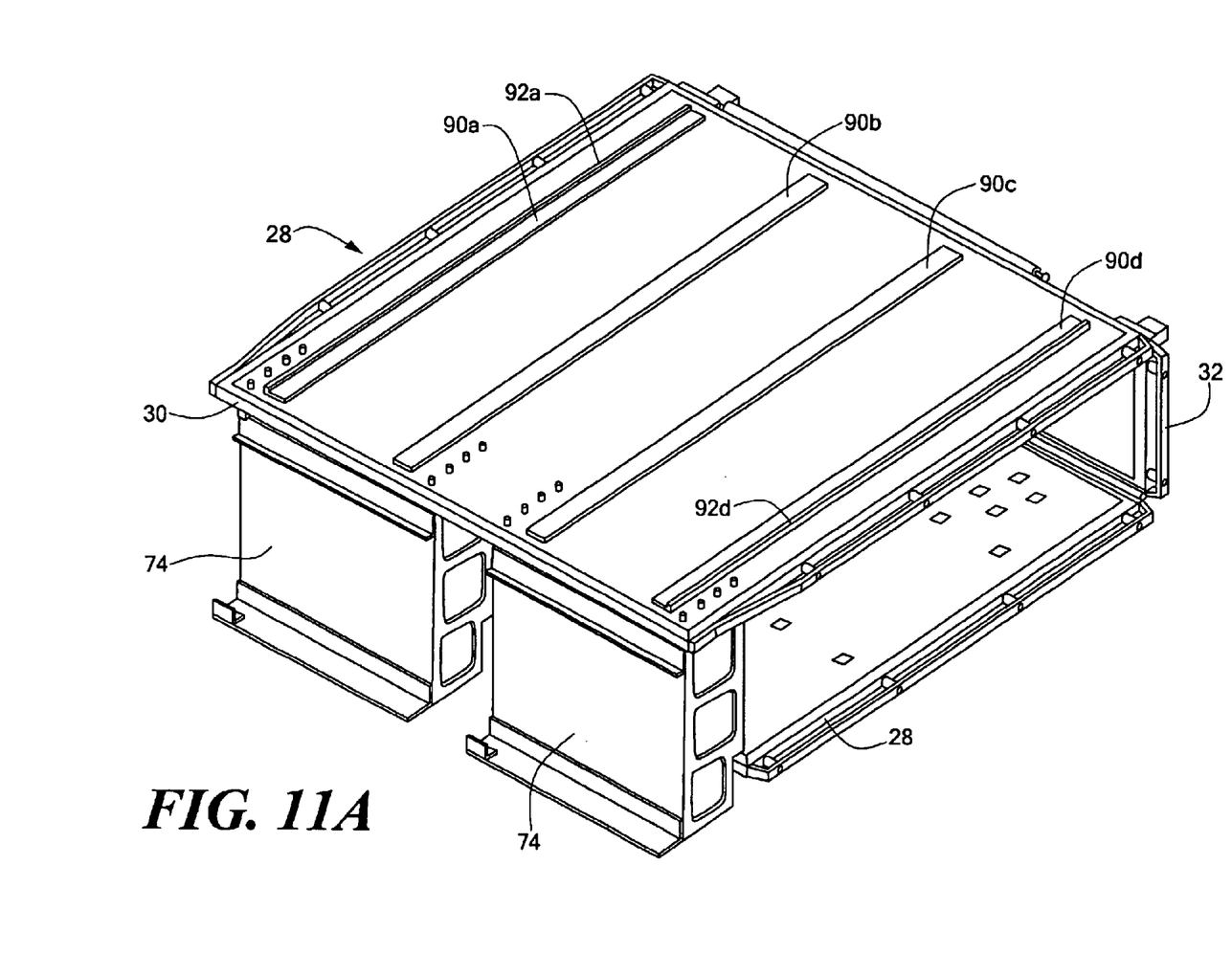
FIG. 11 is a three dimensional schematic view showing the bottom portion of a folding command table and the low friction strips associated with the preferred embodiment of the subject invention.
Figure 11B:
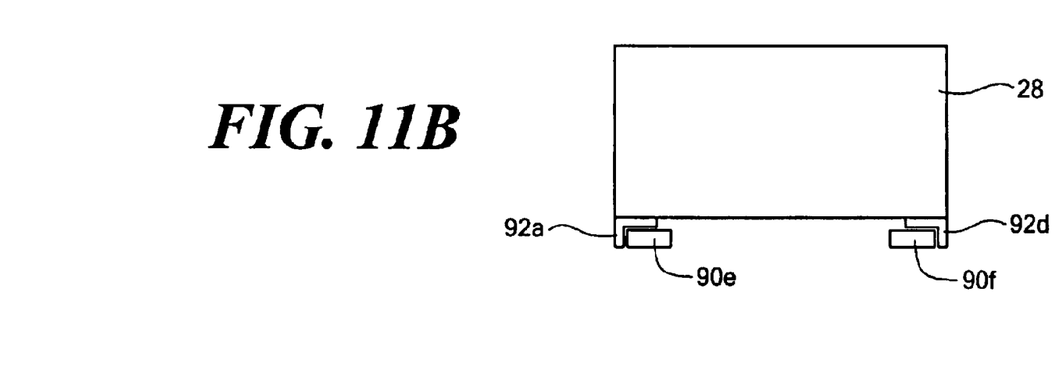

Preferably, low friction Teflon strips 90a–90d, FIGS. 3 and 11A, running in the horizontal direction are fastened to either the bed of the vehicle or the bottom of forward section 30 of table 28 or both to assist in removing table 28 from and stowing table 28 in the bed of the vehicle. The strips also distribute the weight of the table over the bed of the vehicle. Outer strips 90a and 90d on the bottom of table 28 may include ridges 92a and 92d for securing table 28 in the transverse direction when mated with corresponding strips 90e and 90f or other structures on the bed of the vehicle as shown in FIG. 11B. Other low friction loading designs may also be used.

Figure 12:
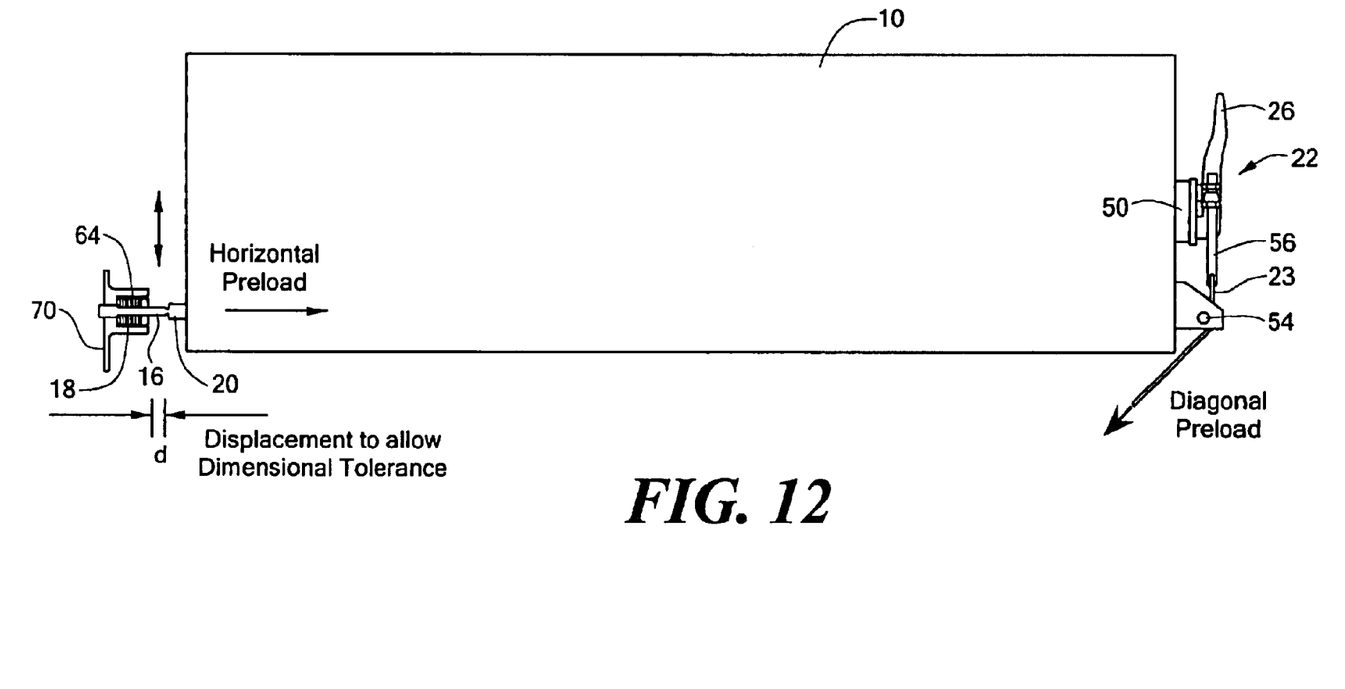
FIG. 12 is a force diagram showing the primary forces acting on the cargo by the loading system of the subject invention.

For any cargo 10, FIG. 12, the pin 16 and receptacle assemblies support the load radially and provide a horizontal pre-load with a displacement due to washers 64 which provide for dimensional tolerance. Tensioning system 26 provides a diagonal pre-load as shown.

Figure 13:
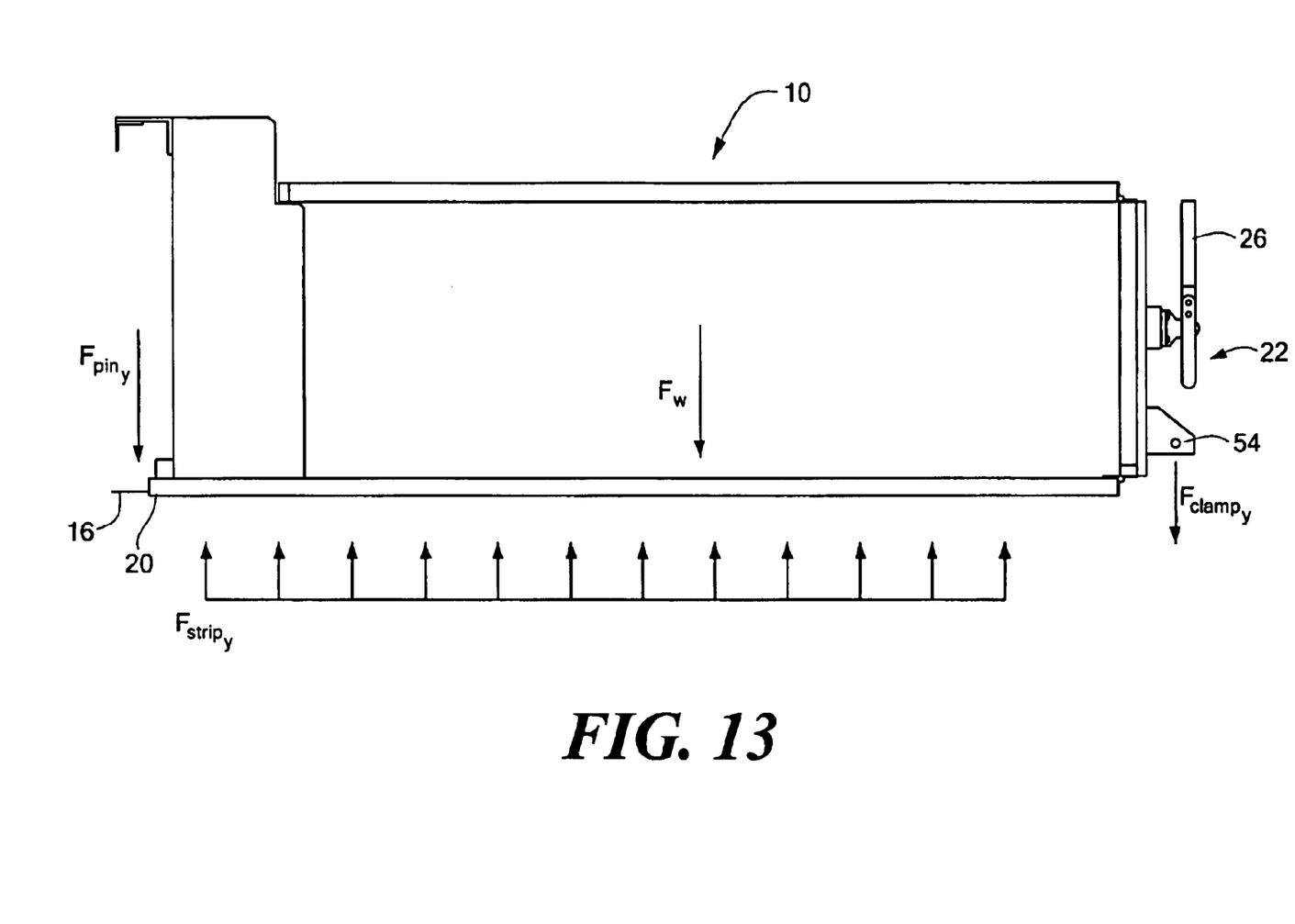
FIG. 13 is a vertical reaction load diagram for the loading system of the subject invention.

FIG. 13 and Table 1 below delineate exemplary reaction loads in the vertical direction.

TABLE 1

| Acceleration | F clamps y | F strips y | F pins y | Safety Factor |
| --- | --- | --- | --- | --- |
| −6 g | −950 | 251 | −950 | 3.0 |
| 6 g | −950 | 4211 | −950 | 3.0 |

Figure 14:
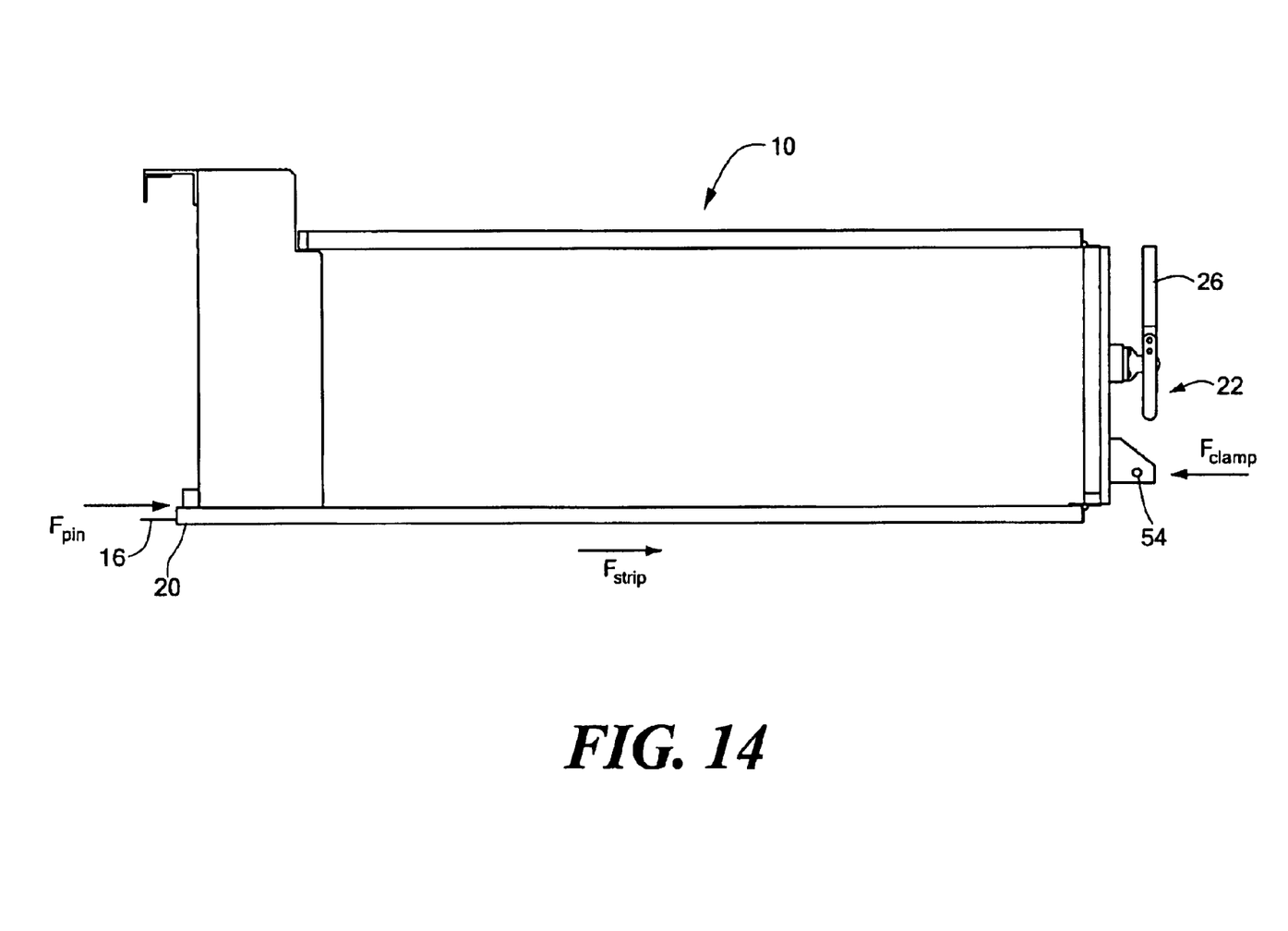
FIG. 14 is a horizontal reaction load diagram for the loading system of the subject invention.

FIG. 14 and Table 2 below delineate exemplary reaction loads in the horizontal direction.

TABLE 2

| Acceleration | F pins x | F clamps x | F strips x | Safety Factor |
| --- | --- | --- | --- | --- |
| −3 g | 960 | 1891 | 89 | 1.5 |
| 3 g | 960 | 38 | 13 | 3.0 |

Figure 15:
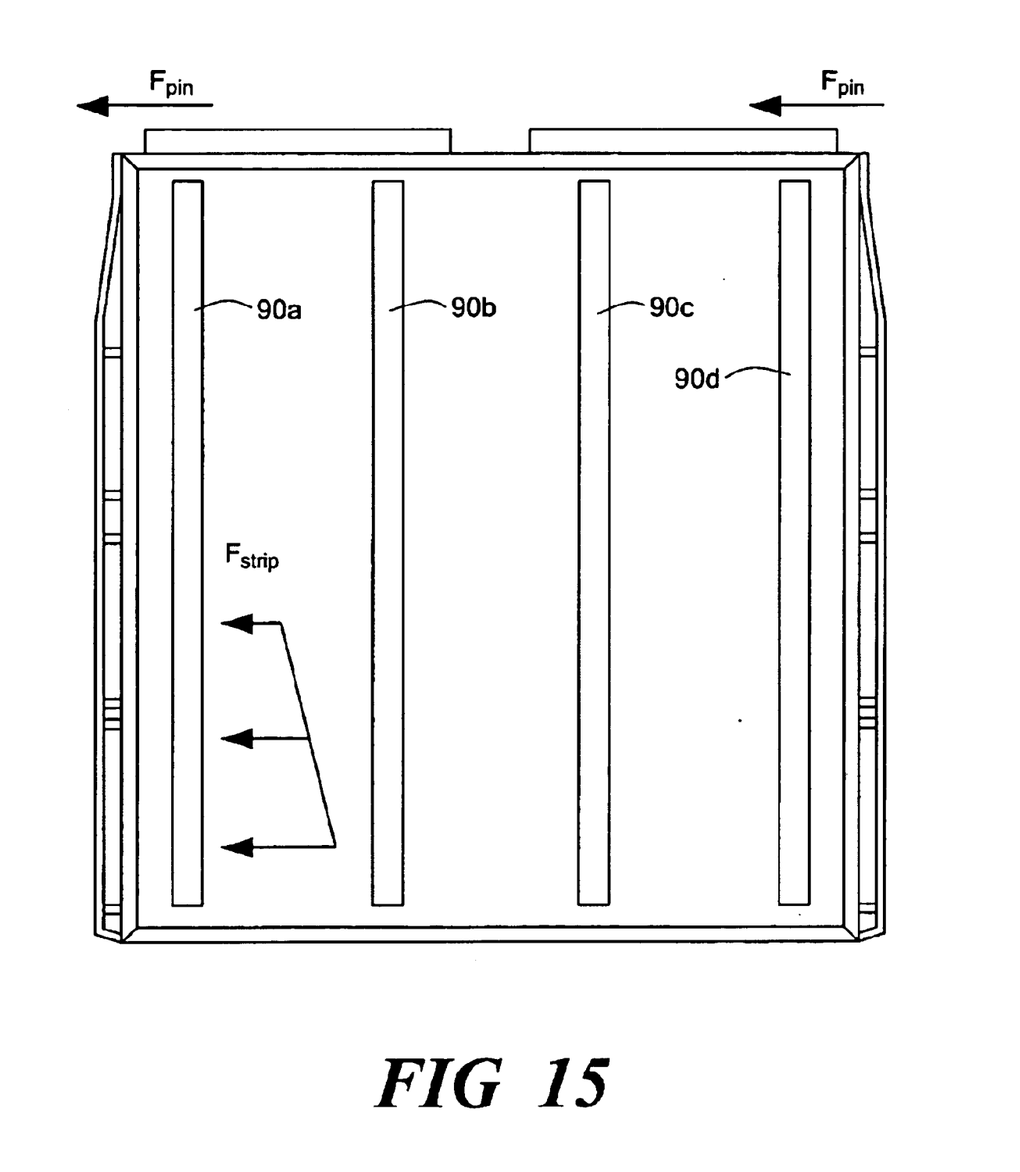
FIG. 15 is a transverse reaction load diagram for the loading system of the subject invention.

FIG. 15 and Table 3 below delineate exemplary reaction loads in the transverse direction.

TABLE 3

| Acceleration | F pin x | F strip x | Safety Factor |
| --- | --- | --- | --- |
| −3 g | −454 | 536 | 5+ |
| 3 g | −454 | −536 | 5+ |

The discussion above relates primarily to a foldable command table and an HMMWV vehicle but the subject invention is not so limited: many other types of cargo may be secured in the bed or elsewhere with respect to many difference types of vehicles including land vehicles, rail cars, and even aircraft.

In this way, the invention provides a new loading system for securing cargo in the bed of the vehicle in a ruggedized manner and yet also facilitates easy stowage and deployment in an ergonomic manner even when access to portions of the cargo is restricted and when the cargo is heavy and or awkward to handle. Deployment and stowage is efficient and quick. The loading system pre-loads the cargo and accommodates dimensional tolerances and also provides high structural strength for ruggedized conditions.

Thus, a stable and secure loading system which at the same time facilitates deployment and stowage in an ergonomic manner is effected by the combination of forward deflecting assemblies which secure the cargo radially and pre-load the cargo and, in addition, rearward tensioning assemblies providing both horizontal and vertical loading and ease of deployment and stowage. Teflon support strips between the bottom of the cargo and the bed of the vehicle further facilitate deployment and stowage and also secure the cargo in the transverse direction. There are no fasteners which must be coupled and decoupled. Instead, the system provides for quick loading, securing, releasing, and deployment of the cargo.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims:

What is claimed is:

1. A loading system for securing cargo, the system comprising:
    at least two spaced forwardly located pin and receptacle assemblies each including:
        a pin biased outward with respect to a housing fixed to one of the cargo and a vehicle, and
        a receptacle on the other of the cargo and the vehicle for receiving the pin to pre-load the cargo and to secure the cargo in vertical and transverse directions; and
    at least two spaced rearwardly located tensioning systems each including:
        a member securable to one of the cargo and the vehicle,
        a pivoting clamp handle secured to the other of the cargo and the vehicle for tensioning the member, and
        a member guide which orients the member at an angle with respect to the vertical direction to secure the cargo in both the horizontal and vertical directions.

2. The system of claim 1 further including low friction strips running in the horizontal direction between the bed and the cargo assisting in deployment and stowage of the cargo.

3. The system of claim 2 in which selected strips include a ridge for securing the cargo in the transverse direction.

4. The system of claim 1 in which the cargo is a foldable command table including an aft section, a forward section, and an intermediate section hinged to the forward section and the aft section, and at least one bracket upstanding from the proximal end of the forward section supporting the distal end of the aft section when the aft section is folded up and over the forward section.

5. The system of claim 4 in which the pin and receptacle assemblies are located at the proximal end of the forward section and the clamping systems are located on the intermediate section.

6. The system of claim 1 in which the pin includes a tapered tip.

7. The system of claim 1 in which a plurality of washers are disposed about the pin and received in the housing for biasing the pin.

8. The system of claim 1 in which the receptacle is in the form of a block on the cargo with a cavity therein for receiving the pin.

9. The system of claim 1 further including a clamp plate with an ear to which the handle is pivotably connected.

10. The system of claim 9 further including a strap guide fixed to the clamp plate.

11. The system of claim 9 further including a tensioner pivotably connected to the handle.

12. The system of claim 9 in which the clamp plate is secured to the cargo.

13. A loading system for securing a folding command table in the bed of a vehicle, the folding command table including an aft section, a forward section, an intermediate section hinged to the forward section and the aft section, and at least one bracket upstanding from the proximal end of the forward section supporting the distal end of the aft section when the aft section is folded up and over the forward section, the loading system comprising:
    at least two spaced forwardly located pin and receptacle assemblies each including:
        a receptacle on the table located proximate the intersection of the bracket and the forward section of the table, and
        a pin biased outward with respect to a housing fixed to the forward section of the vehicle bed, the pin received in the receptacle to secure the table in the vertical and transverse directions; and
    at least two spaced rearwardly located clamping systems each including:
        a clamp plate secured to the intermediate section of the table,
        a clamp handle pivotable with respect to the clamp plate,
        a strap tensioner pivotably connected to the handle,
        a strap extending between the strap tensioner and the vehicle, and
        a strap guide fixed to the clamp plate below the clamp handle to orient the strap to secure the cargo in both the vertical and horizontal directions.

14. The system of claim 13 further including low friction strips running in the horizontal direction between the bed and the cargo assisting in deployment and storage of the cargo.

15. The system of claim 14 in which selected strips include a ridge for securing the cargo in the transverse direction.

16. The system of claim 13 in which the pin includes a tapered tip.

17. The system of claim 13 in which a plurality of washers are disposed about the pin and received in the housing for biasing the pin.

18. The system of claim 13 in which the receptacle is in the form of a block with a cavity therein for receiving the pin.

19. The system of claim 14 in which the clamp plate includes an ear to which the handle is pivotably connected.

20. A loading system comprising:
    at least one pin and receptacle assembly including a pin biased outwardly with respect to a housing and a receptacle for receiving the pin to pre-load cargo and secure the cargo in the vertical and transverse directions; and
    at least one tensioning system for securing the cargo in both the horizontal and vertical directions.

21. The loading system of claim 20 in which the tensioning system includes:
- a strap,
- a pivoting clamp handle for tensioning the strap, and
- a strap guide which orients the strap at an angle to secure the cargo in both the horizontal and vertical directions.

22. A loading system comprising:
- a first assembly configured to pre-load cargo in the horizontal direction and to secure the cargo in the vertical and transverse directions; and
- a tensioning assembly including a strap, a pivoting clamp handle for tensioning the strap, and a strap guide which orients the strap at an angle to secure the cargo in both the vertical and horizontal connections.

23. The loading system of claim 22 in which the first assembly includes a deflectable pin and receptacle assembly.

24. A loading system comprising:
- first means for securing cargo in the vertical and transverse directions and for pre-loading the cargo in the horizontal direction; and
- second means for securing the cargo in both the horizontal and vertical directions.

25. The loading system of claim 24 in which the first means is a forwardly located deflectable pin and receptacle assembly.

26. The loading system of claim 24 in which the second means is a rearwardly located tensioning system.

* * * * *